US012776462B2

(12) United States Patent

Naka et al.

(10) Patent No.: US 12,776,462 B2

(45) Date of Patent: Oct. 27, 2026

(54) VACUUM CIRCUIT BREAKER

(71) Applicant: Mitsubishi Electric Corporation, Tokyo (JP)

(72) Inventors: Shinpei Naka, Tokyo (JP); Yasunori Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 344 days.

(21) Appl. No.: 18/703,393

(22) PCT Filed: Dec. 20, 2021

(86) PCT No.: PCT/JP2021/047010

§ 371 (c)(1), (2) Date: Apr. 22, 2024

(87) PCT Pub. No.: WO2023/119358

PCT Pub. Date: Jun. 29, 2023

(65) Prior Publication Data

US 2024/0347294 A1 Oct. 17, 2024

(51) Int. Cl.

*H01H 33/42* (2006.01)
*H01H 33/662* (2006.01)
*H01H 33/666* (2006.01)

(52) U.S. Cl.

CPC ...... *H01H 33/42* (2013.01); *H01H 33/66207* (2013.01); *H01H 33/666* (2013.01)

(58) Field of Classification Search

CPC ............. H01H 33/42; H01H 33/66207; H01H 33/666; H01H 2033/6667; H01H 33/40;

(Continued)

(56) References Cited

U.S. PATENT DOCUMENTS 5,451,731 A 9/1995 Yoshizumi et al.
8,748,770 B2 * 6/2014 Nakayama ......... H02B 13/0354 218/78

(Continued)

FOREIGN PATENT DOCUMENTS

JP H05182565 A 7/1993
JP 2009004265 A 1/2009

(Continued)

OTHER PUBLICATIONS

International Search Report (PCT/ISA/210) with translation and Written Opinion (PCT/ISA/237) mailed on Mar. 1, 2022, by the Japanese Patent Office as the International Searching Authority for International Application No. PCT/JP2021/047010. (9 pages).

*Primary Examiner* — William A Bolton

(74) *Attorney, Agent, or Firm* — Buchanan Ingersoll & Rooney PC

(57) ABSTRACT

A vacuum circuit breaker includes: a tank having a tubular shape; a vacuum valve including a movable contact, a stationary contact, a movable lead electrically connected to the movable contact, and a stationary lead electrically connected to the stationary contact, and accommodated in the tank; and a contact driver that opens and closes the movable contact and the stationary contact by moving the movable contact by a driving force transmitted from a manipulator. The contact driver includes a torsion bar spring that generates contact pressure that presses the movable contact against the stationary contact by being twisted by the driving force in a state where the movable contact and the stationary contact are in contact with each other.

6 Claims, 10 Drawing Sheets

(58) Field of Classification Search
CPC ...... H01H 33/50; H01H 33/46; H01H 3/3042; H01H 3/38
USPC ............... 218/140, 118, 120, 139, 153, 154; 361/619
See application file for complete search history.

(56) References Cited

U.S. PATENT DOCUMENTS

| | | | | |
|---|---|---|---|---|
| 8,895,884 | B2 * | 11/2014 | Yamamoto | H01H 33/666 218/7 |
| 9,136,674 | B2 * | 9/2015 | Ohtsuka | H02B 13/0354 |
| 9,208,978 | B2 * | 12/2015 | Yano | H01H 9/16 |
| 9,431,800 | B2 * | 8/2016 | Yoshida | H02B 13/045 |
| 9,806,504 | B2 * | 10/2017 | Yoshitomo | H02B 13/0358 |
| 9,893,515 | B2 * | 2/2018 | Arioka | H01H 33/161 |
| 10,262,819 | B2 * | 4/2019 | Nagatake | C22C 9/00 |
| 10,650,994 | B2 * | 5/2020 | Bauer | H01H 33/42 |
| 2018/0005784 | A1 * | 1/2018 | Nagatake | H01H 33/662 |
| 2019/0157016 | A1 | 5/2019 | Tanigaki et al. | |
| 2021/0233725 | A1 | 7/2021 | Maeno et al. | |

FOREIGN PATENT DOCUMENTS

| | | | |
|---|---|---|---|
| JP | 2019032994 | A | 2/2019 |
| WO | 2018025311 | A1 | 2/2018 |
| WO | 2019215885 | A1 | 11/2019 |

* cited by examiner

VACUUM CIRCUIT BREAKER

FIELD

The present disclosure relates to a vacuum circuit breaker including a vacuum valve mounted in a tank.

BACKGROUND

In a vacuum valve used in a vacuum circuit breaker, one of a pair of contacts is movable, and the contact moves when a disconnected state and a connected state are switched.

As disclosed in Patent Literature 1, a pair of contacts of a vacuum valve disposed inside a vacuum circuit breaker are both disk-shaped electrodes. The electrodes abut each other during connection. In addition, a coil spring mounted in a component that transmits a driving force generated by a manipulator to one of the pair of contacts is compressed and contracted to generate a pressure necessary for ensuring contact between the electrodes. The pressure necessary for ensuring the contact between the electrodes is generally referred to as contact pressure, and the coil spring that generates the pressure necessary for ensuring the contact between the electrodes is generally referred to as a contact pressure spring.

CITATION LIST

Patent Literature

Patent Literature 1: Japanese Patent Application Laid-open No. 2019-032994

SUMMARY OF INVENTION

Problem to be Solved by the Invention

In an opening operation of the vacuum circuit breaker, the contact of the vacuum valve starts to operate after the compressed and contracted contact pressure spring has finished extending. When the compressed and contracted contact pressure spring has finished extending and the contact starts to move, an impact load is applied to the component that transmits the driving force generated by the manipulator to one of the pair of contacts. Therefore, the component that transmits the driving force generated by the manipulator to one of the pair of contacts needs to be designed to withstand the impact load, so that the component is increased in size. Furthermore, in order to drive a large component, it is necessary to use a manipulator having a large output, which becomes a factor that leads to an increase in cost of the vacuum circuit breaker. On the other hand, when a contact pressure spring having a weak elastic force is used for the purpose of reducing the impact load when the contact starts to move, the contact pressure becomes insufficient, which hinders energization.

The present disclosure has been made in view of the above, and an object of the present disclosure is to obtain a vacuum circuit breaker that achieves both downsizing of equipment and ensuring contact pressure that does not hinder energization.

Means to Solve the Problem

To solve the above problems and achieve the object, a vacuum circuit breaker according to the present disclosure includes: a tank having a tubular shape; a vacuum valve including a movable contact, a stationary contact, a movable lead electrically connected to the movable contact, and a stationary lead electrically connected to the stationary contact, the vacuum valve being accommodated in the tank; and a contact driver configured to open and close the movable contact and the stationary contact by moving the movable contact by a driving force transmitted from a manipulator. The contact driver includes a torsion bar spring configured to generate contact pressure that presses the movable contact against the stationary contact by being twisted by the driving force in a state where the movable contact and the stationary contact are in contact with each other.

Effects of the Invention

According to the present disclosure, it is possible to achieve an effect of obtaining a vacuum circuit breaker that achieves both downsizing of equipment and ensuring contact pressure that does not hinder energization.

DESCRIPTION OF EMBODIMENTS

Hereinafter, a vacuum circuit breaker according to embodiments will be described in detail with reference to the drawings.

First Embodiment

Figure 1:
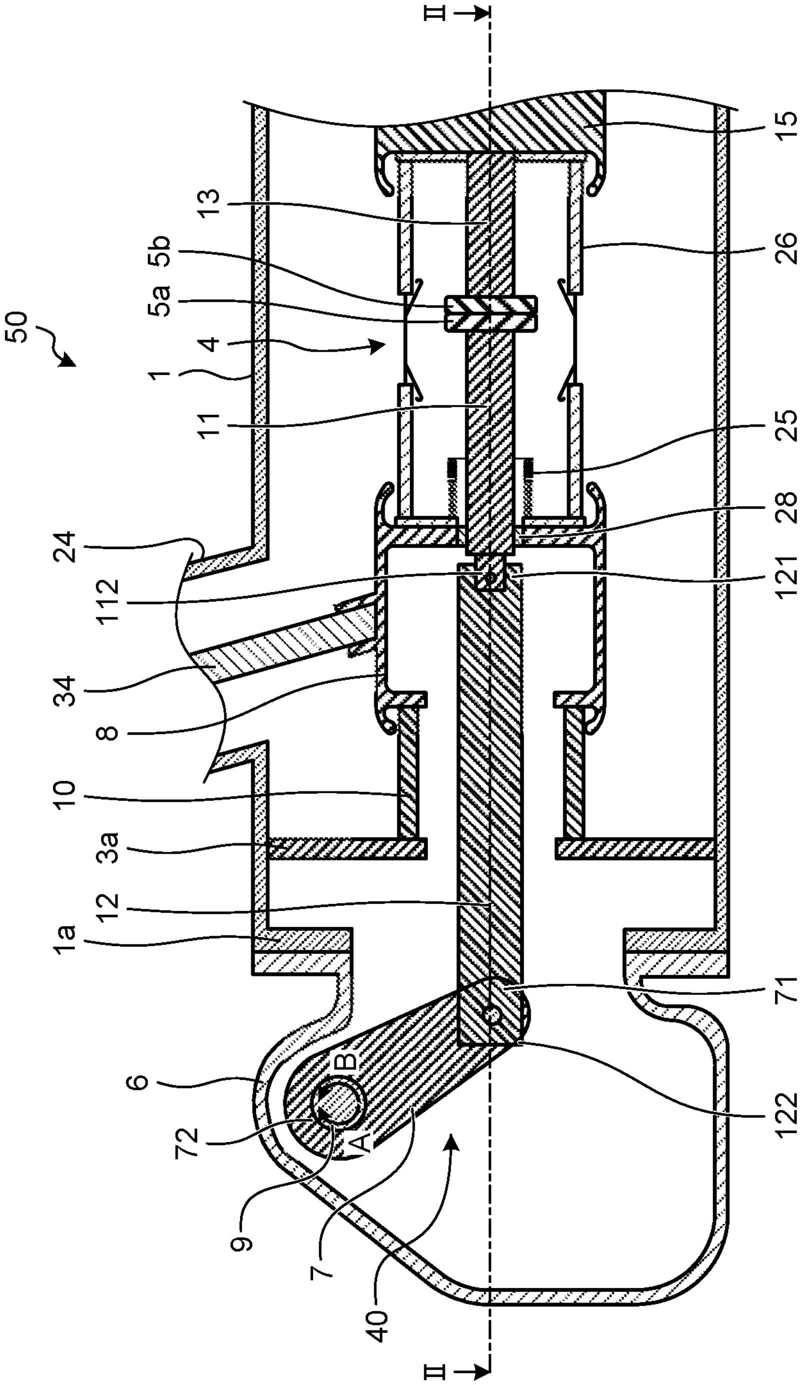
FIG. 1 is a vertical cross-sectional view of a vacuum circuit breaker according to a first embodiment.
Figure 2:
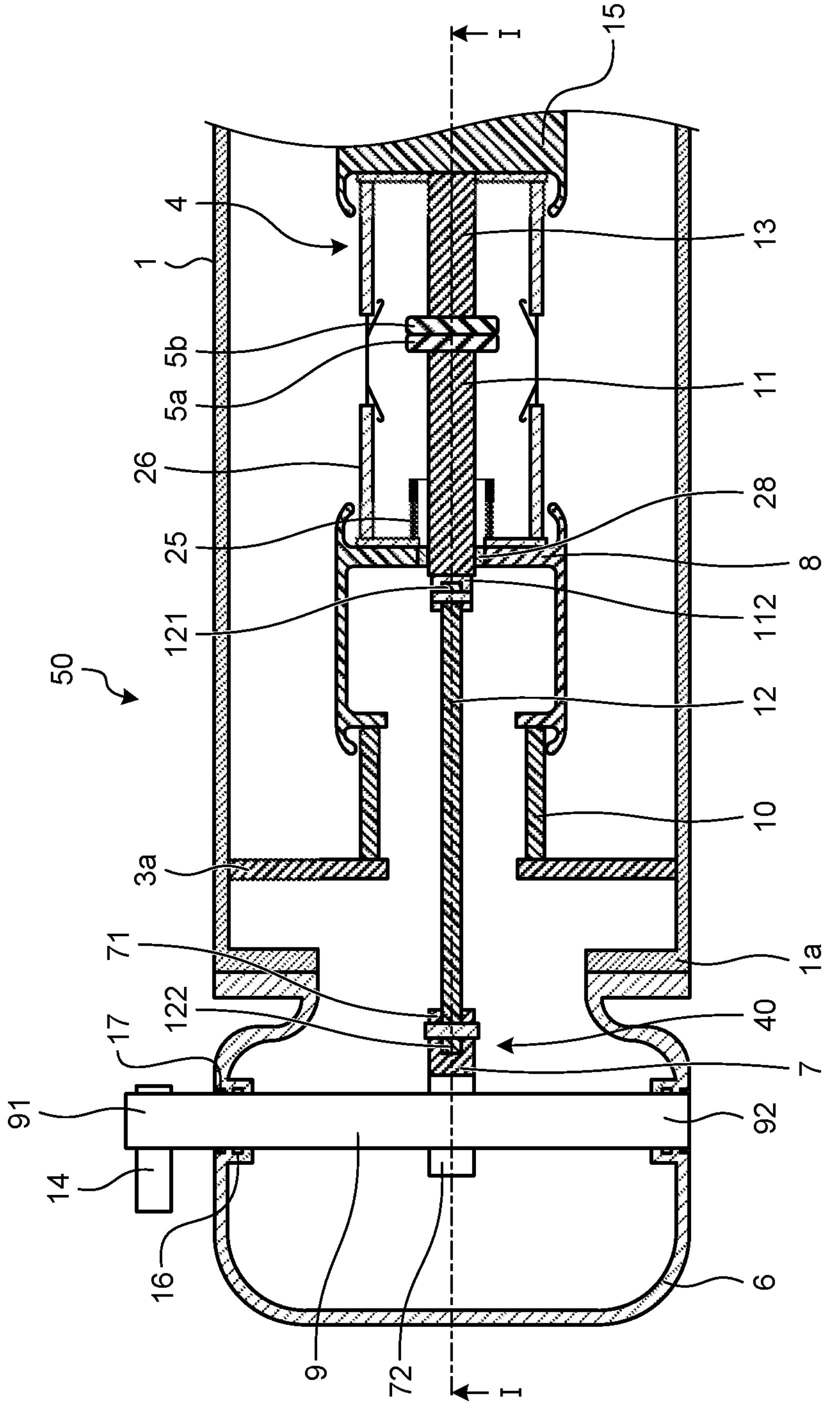
FIG. 2 is a horizontal cross-sectional view of the vacuum circuit breaker according to the first embodiment.

FIG. 1 is a vertical cross-sectional view of a vacuum circuit breaker according to a first embodiment. FIG. 2 is a horizontal cross-sectional view of the vacuum circuit breaker according to the first embodiment. In FIGS. 1 and 2, a vacuum circuit breaker 50 is in a connected state where a movable contact 5*a* and a stationary contact 5*b* are in contact with each other. FIG. 2 illustrates a horizontal cross section taken along a position of line II-II in FIG. 1. FIG. 1 illustrates a vertical cross section taken along a position of line I-I in FIG. 2. The vacuum circuit breaker 50 according to the first embodiment includes: a tank 1 having a tubular shape and filled with an insulating gas; a movable contact 5*a* and a stationary contact 5*b*; a vacuum valve 4 insulated and supported in the tank 1; and a movable-side external conductor 34 and a stationary-side external conductor, which are disposed in a pair of bushings 24 extending upward from the tank 1. Note that the stationary-side bushing and the stationary-side external conductor are not illustrated.

The vacuum valve 4 includes: a vacuum container 26; a movable lead 11 electrically connected to the movable contact 5*a*; a stationary lead 13 electrically connected to the stationary contact 5*b*; a bellows 25 connecting an end face of the vacuum container 26 on a movable side and the movable lead 11 to each other. The bellows is extendable and contractible. In the vacuum valve 4, the movable contact 5*a* is movable. When the disconnected state and the connected state are switched, the movable contact 5*a* moves. A support plate 3*a* is mounted inside the tank 1. The support plate 3*a* has a disk shape in which a hole is formed at the center. An end portion of the tank 1 on a stationary side is closed by a support plate (not illustrated) having a disk shape without a hole. Note that, in an arrangement direction of the movable contact 5*a* and the stationary contact 5*b*, a direction from the stationary contact 5*b* toward the movable contact 5*a* is the "movable side", and a direction from the movable contact 5*a* toward the stationary contact 5*b* is the "stationary side".

An end face 1*a* of the tank 1 on the movable side has a disk shape with a hole. The tank 1 includes a cap 6 that covers an end portion of the tank 1 on the movable side. Note that the cap 6 may be integrated with a body portion of the tank 1.

The vacuum container 26 accommodates the movable contact 5*a*, the stationary contact 5*b*, and the stationary lead 13. The movable lead 11 protrudes outward from one end portion of the vacuum container 26. The bellows 25 connects the vacuum container 26 and the movable lead 11 to each other. The bellows 25 extends in a connected state where the movable contact 5*a* and the stationary contact 5*b* are closed, and contracts in a disconnected state where the movable contact 5*a* and the stationary contact 5*b* are opened.

Furthermore, the vacuum circuit breaker 50 includes a movable-side shield 8 and a movable-side insulating support tube 10. The movable-side shield 8 is made of a conductive material, formed in a tubular shape, and mounted on a movable side of the vacuum valve 4. The movable-side insulating support tube 10 insulates and supports the movable-side shield 8 on the support plate 3*a*. A contact 28 made of a conductive material is mounted inside the tube of the movable-side shield 8. The movable-side shield 8 electrically connects a lower end of the movable-side external conductor 34 to the movable lead 11 via the contact 28. A stationary-side shield 15 electrically connects a lower end of the stationary-side external conductor (not illustrated) to the stationary lead 13.

The vacuum circuit breaker 50 according to the first embodiment includes a contact driver 40 that opens and closes the movable contact 5*a* and the stationary contact 5*b* by moving the movable contact 5*a* by a driving force transmitted from a manipulator. The contact driver 40 includes a rotary seal shaft 9 serving as a torsion bar spring that is twisted by the driving force in a state where the movable contact 5*a* and the stationary contact 5*b* are in contact with each other and generates contact pressure that presses the movable contact 5*a* against the stationary contact 5*b*. The contact driver 40 includes: the rotary seal shaft 9 having one end portion 91 protruding outward from the cap 6, which is a portion of the tank 1; a manipulation lever 14 fixed to the one end portion 91 of the rotary seal shaft 9 and is rotated by receiving the driving force from the manipulator; a lever 7 fixed to the rotary seal shaft 9 inside the tank 1 and rotates together with the rotary seal shaft 9; and an insulating rod 12 connecting the lever 7 and the movable lead 11 to each other.

The insulating rod 12 protrudes outward from the tank 1 from the end face 1*a* of the tank 1 on the movable side, and an end portion 122 of the insulating rod 12 on the movable side is disposed inside the cap 6. The end portion 122 of the insulating rod 12 on the movable side is rotatably coupled to an end portion 71 of the lever 7 on the stationary side. An end portion 121 of the insulating rod 12 on the stationary side is fixed to an end portion 112 of the movable lead 11 on the movable side.

An end portion 72 of the lever 7 on the movable side is fixed to the rotary seal shaft 9. The rotary seal shaft 9 is made of spring steel. The one end portion 91 of the rotary seal shaft 9 protrudes outward from the cap 6 and is fixed to the manipulation lever 14 of the manipulator (not illustrated) installed outside the tank 1. An opposite end portion 92 of the rotary seal shaft 9 is exposed to the outside of the cap 6, and is on a level with the surface of the cap 6. The rotary seal shaft 9 is mounted above the movable lead 11. The rotary seal shaft 9 is supported by the cap 6 via a bearing 16. A gap formed between the rotary seal shaft 9 and the cap 6 is sealed by a rotary seal 17.

Figure 3:
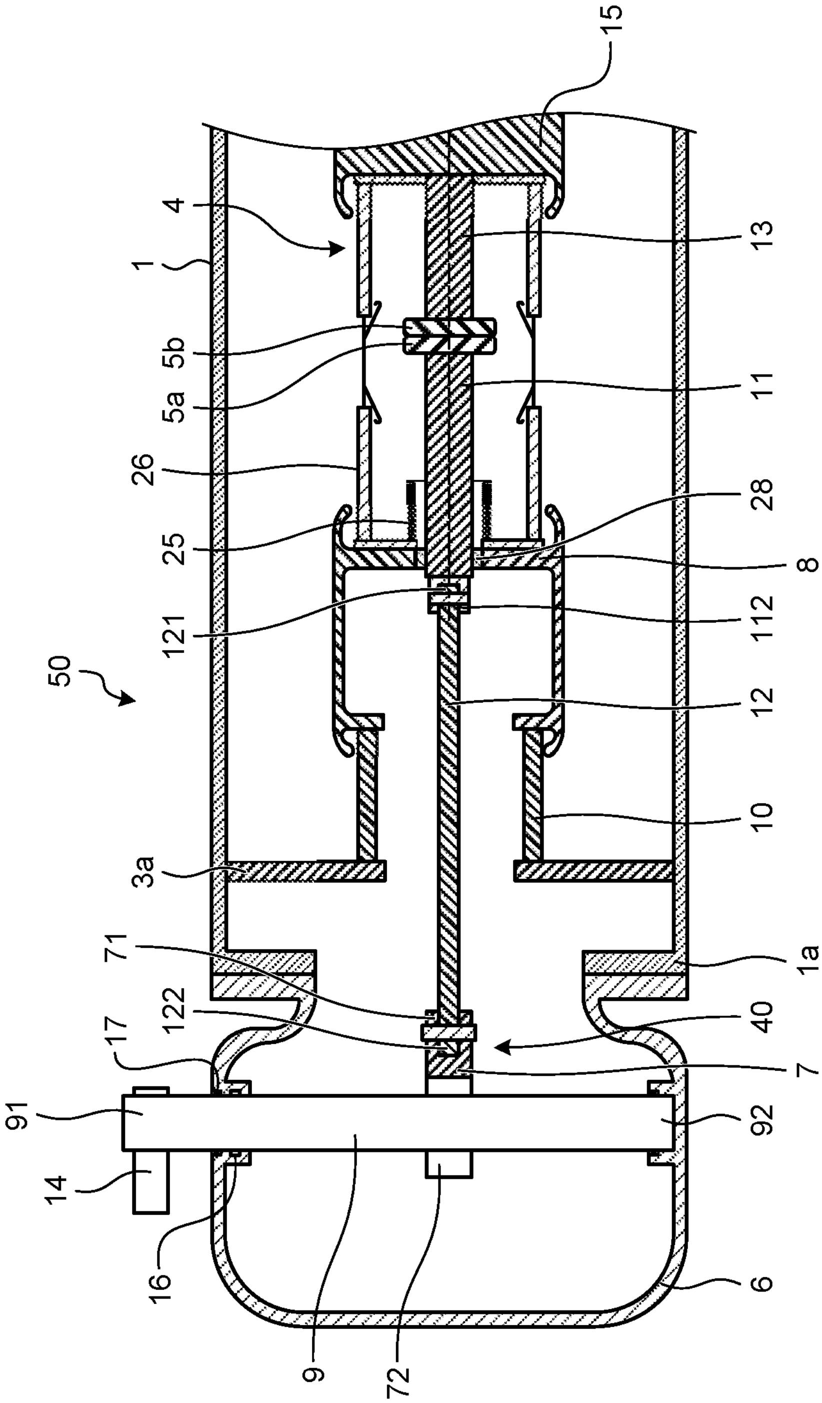
FIG. 3 is a diagram illustrating a modification of the vacuum circuit breaker according to the first embodiment.

FIG. 3 is a diagram illustrating a modification of the vacuum circuit breaker according to the first embodiment. The opposite end portion 92 of the rotary seal shaft 9 may not be exposed to the outside of the cap 6.

In the following description, rotation of the rotary seal shaft 9 in a direction in which a lower surface of the rotary seal shaft 9 moves toward the movable side is referred to as "forward rotation". Furthermore, rotation of the rotary seal shaft 9 in a direction in which the lower surface of the rotary seal shaft 9 moves toward the stationary side is referred to as "reverse rotation". Note that, in FIG. 1, the direction of forward rotation of the rotary seal shaft 9 is indicated by arrow A, and the direction of reverse rotation of the rotary seal shaft 9 is indicated by arrow B.

When the vacuum circuit breaker 50 is in a connected state, the rotary seal shaft 9 is twisted. The rotary seal shaft 9 presses the movable contact 5*a* against the stationary contact 5*b* and generates contact pressure necessary for energization. In the vacuum circuit breaker 50 according to the first embodiment, by the manipulator reversely rotating the rotary seal shaft 9, the end portion 71 of the lever 7 on the stationary side moves toward the stationary side, and the insulating rod 12 and the movable lead 11 also move toward the stationary side. In a case where the rotary seal shaft 9 further reversely rotates in a state where the movable contact 5*a* and the stationary contact 5*b* are in contact with each other, the lever 7, the insulating rod 12, and the movable lead 11 are not displaced, so that the rotary seal shaft 9 is twisted, which generates contact pressure.

When the rotary seal shaft 9 is rotated forward by the driving force from the manipulator when the vacuum circuit breaker 50 is in a connected state, the twisting of the rotary seal shaft 9 is released, which eliminates the generation of the contact pressure. When the rotary seal shaft 9 further rotates forward after the twisting of the rotary seal shaft 9 is released, the end portion 71 of the lever 7 on the stationary side moves toward the movable side. When the end portion 71 of the lever 7 on the stationary side moves toward the movable side, the insulating rod 12, the end portion 122 on the movable side of which is coupled to the lever 7, moves toward the movable side. When the insulating rod 12 moves toward the movable side, the movable lead 11, the end portion 112 on the movable side of which is coupled to the insulating rod 12, moves toward the movable side. The movement of the movable lead 11 toward the movable side causes the movable contact 5*a* to be separated from the stationary contact 5*b*, leading the vacuum circuit breaker 50 to enter a disconnected state.

When the rotary seal shaft 9 is reversely rotated by the driving force from the manipulator when the vacuum circuit breaker 50 is in a disconnected state, the end portion 71 of the lever 7 on the stationary side moves toward the stationary side. When the end portion 71 of the lever 7 on the stationary side moves toward the stationary side, the insulating rod 12, the end portion 122 on the movable side of which is coupled to the lever 7, moves toward the stationary side. When the insulating rod 12 moves toward the stationary side, the movable lead 11, the end portion 112 on the movable side of which is coupled to the insulating rod 12, moves toward the stationary side. The movement of the movable lead 11 toward the stationary side causes the movable contact 5*a* to come in contact with the stationary contact 5*b*, leading the vacuum circuit breaker 50 to enter a connected state. When the rotary seal shaft 9 further reversely rotates in a state where the movable contact 5*a* and the stationary contact 5*b* are in contact with each other, the rotary seal shaft 9 is twisted and the movable contact 5*a* is pressed against the stationary contact 5*b*, which generates contact pressure.

The vacuum circuit breaker 50 according to the first embodiment generates contact pressure by the rotary seal shaft 9 being twisted. Therefore, no collision occurs between components when the contact pressure is released. Accordingly, even if each component that transmits the driving force from the manipulator is downsized, the contact pressure can be ensured.

Second Embodiment

Figure 4:
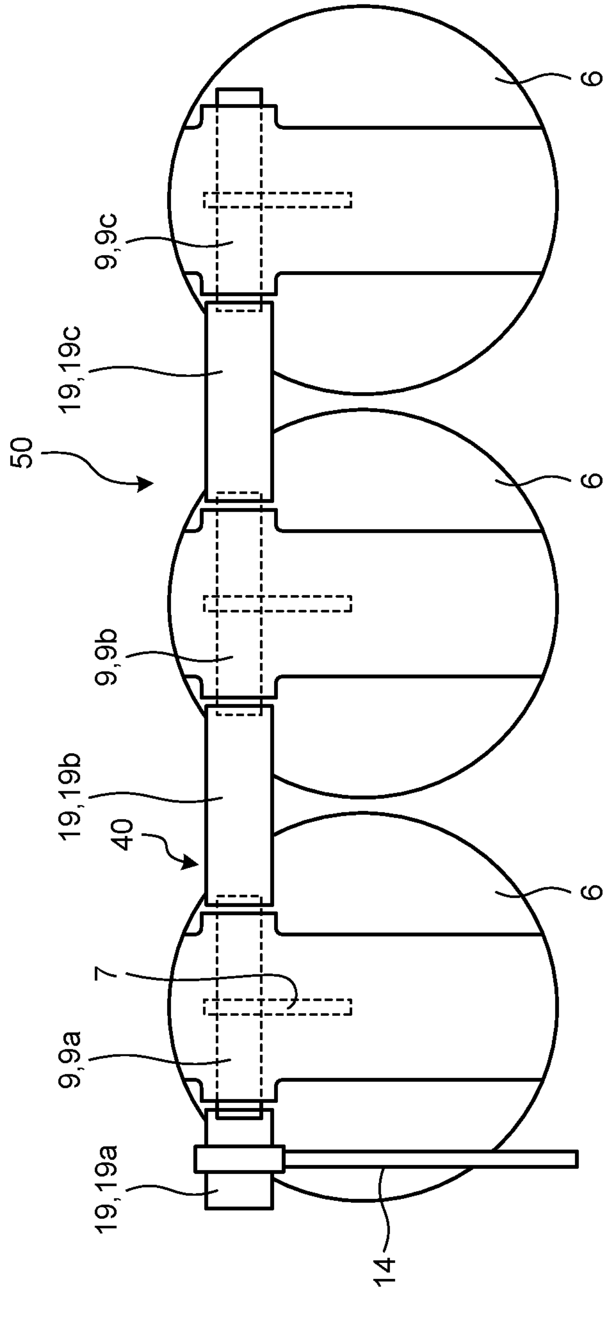
FIG. 4 is a side view of a vacuum circuit breaker according to a second embodiment.

FIG. 4 is a side view of a vacuum circuit breaker according to a second embodiment. In the vacuum circuit breaker 50 according to the second embodiment, three tanks 1 are mounted corresponding to three phases of an alternating current. Each tank 1 includes the cap 6 and accommodates the vacuum valve 4 therein.

The vacuum circuit breaker 50 according to the second embodiment includes the contact driver 40 that opens and closes the movable contact 5*a* and the stationary contact 5*b* by moving the movable contact 5*a* by the driving force transmitted from the manipulator. The contact driver 40 includes the rotary seal shafts 9, couplers 19, the manipulation lever 14, the levers 7, and the insulating rods 12. The rotary seal shafts 9 are each mounted in the tank 1 in each phase and both end portions of the rotary seal shaft 9 protrude outward from the tank 1. The couplers 19 are each fixed to an end portion of the rotary seal shaft 9 and rotate together with the rotary seal shaft 9. The manipulation lever 14 is fixed to the coupler 19 located at one end of the plurality of tanks 1 in the arrangement direction of the tanks 1. The manipulation lever 14 rotates the couplers 19 and the rotary seal shafts 9 by receiving the driving force from the manipulator. The levers 7 are each fixed to the rotary seal shaft 9 inside the tank 1 in each phase. The lever 7 rotates together with the rotary seal shaft 9. The insulating rods 12 are each mounted inside the tank 1 in each phase. The insulating rod 12 connects the lever 7 and the movable lead 11 to each other. The insulating rod 12 moves in the arrangement direction of the movable contact 5*a* and the stationary contact 5*b* by the rotation of the lever 7.

The rotary seal shaft 9, serving as a torsion bar spring, is made of a material such as carbon steel, and both end portions of the rotary seal shaft 9 protrude outward from the cap 6. The rotary seal shafts 9 of the respective phases are coupled by the couplers 19. Both end portions of the rotary seal shafts 9 and the 19 are subjected to serration machining, which forms a structure in which torque is transmitted between the couplers 19 and the rotary seal shafts 9. The vacuum circuit breaker 50 according to the second embodiment is of a three-phase collective type in which contacts of the vacuum valve 4 in each of the three phases are driven by a common manipulator.

The inner structure of the tank 1 in each phase is similar to that of the vacuum circuit breaker 50 according to the first embodiment. However, the distance between the movable contact 5*a* and the stationary contact 5*b* in a disconnected state is different in each phase. A phase in which the coupler 19 to which the manipulation lever 14 is fixed is coupled to the rotary seal shaft 9 is referred to as a phase A, a phase at the center in the arrangement direction of the tanks 1 is referred to as a phase B, and a phase in which nothing is attached to one end portion of the rotary seal shaft 9 is referred to as a phase C. In the disconnected state, the distance between the movable contact 5*a* and the stationary contact 5*b* in the phase C is the shortest, the distance between the movable contact 5*a* and the stationary contact 5*b* in the phase B is the second shortest, and the distance between the movable contact 5*a* and the stationary contact 5*b* in the phase A is the longest. Hereinafter, when the rotary seal shafts 9 in the phases A, B, and C are distinguished from each other, they are referred to as a rotary seal shaft 9*a*, a rotary seal shaft 9*b*, and a rotary seal shaft 9*c*. Furthermore, when the coupler 19 to which the manipulation lever 14 of the manipulator (not illustrated) is fixed, the coupler 19 between the phases A and B, and the coupler 19 between the phases B and C are distinguished from each other, they are referred to as a coupler 19*a*, a coupler 19*b*, and a coupler 19*c*.

When the vacuum circuit breaker 50 is in a connected state, the couplers 19*a*, 19*b*, and 19*c* are twisted, presses the movable contact 5*a* against the stationary contact 5*b* in the vacuum valve 4 in each phase, and generates contact pressure necessary for energization.

When the rotary seal shaft 9*a* is rotated forward by torque applied by the manipulation lever 14 to the coupler 19*a* when the vacuum circuit breaker 50 is in a connected state, the twisting of the coupler 19*a* is released, which eliminates the generation of the contact pressure in the phase A. When the rotary seal shafts 9*a* and 9*b* are rotated forward by the torque applied by the manipulation lever 14 to the coupler 19*a* after the contact pressure in the phase A is eliminated, the movable contact 5*a* is separated from the stationary contact 5*b* in the tank 1 of the phase A by an operation similar to that of the vacuum circuit breaker 50 according to the first embodiment, so that the phase A enters a disconnected state. Furthermore, the twisting of the coupler 19*b* is released, which eliminates the generation of the contact pressure in the phase B. When the rotary seal shafts 9*a* and 9*b* are further rotated forward by the torque applied by the manipulation lever 14 to the coupler 19*a* after the contact pressure in the phase B is eliminated, the movable contact 5*a* is separated from the stationary contact 5*b* in the tank 1 of the phase B by an operation similar to that of the vacuum circuit breaker 50 according to the first embodiment, so that the phase B enters a disconnected state. Furthermore, the twisting of the coupler 19*c* is released, which eliminates the generation of the contact pressure in the phase C. When the rotary seal shafts 9*a*, 9*b*, and 9*c* are further rotated forward by the torque applied by the manipulation lever 14 to the coupler 19*a* after the contact pressure in the phase C is eliminated, the movable contact 5*a* is separated from the stationary contact 5*b* in the tank 1 of the phase C by an operation similar to that of the vacuum circuit breaker 50 according to the first embodiment, so that the phase C enters a disconnected state.

When the rotary seal shafts 9*a*, 9*b*, and 9*c* are reversely rotated by the torque applied by the manipulation lever 14 to the coupler 19*a* when the vacuum circuit breaker 50 is in a disconnected state, the movable contact 5*a* comes in contact with the stationary contact 5*b* in the tank 1 of the phase C by an operation similar to that of the vacuum circuit breaker 50 according to the first embodiment, so that the phase C enters a connected state. When the manipulation lever 14 further applies torque to the coupler 19*a* in a reverse rotation direction after the movable contact 5*a* comes in contact with the stationary contact 5*b* in the phase C, the rotary seal shafts 9*a* and 9*b* reversely rotate and the coupler 19*c* is twisted, which generates contact pressure in the phase C. Furthermore, the reverse rotation of the rotary seal shafts 9*a* and 9*b* causes the movable contact 5*a* to come in contact with the stationary contact 5*b* in the tank 1 of the phase B by an operation similar to that of the vacuum circuit breaker 50 according to the first embodiment. As a result, the phase B enters a connected state. When the manipulation lever 14 further applies torque to the coupler 19*a* in the reverse rotation direction after the movable contact 5*a* comes in contact with the stationary contact 5*b* in the phase B, the rotary seal shaft 9*a* reversely rotates and the coupler 19*b* is twisted, which generates contact pressure in the phase B. Furthermore, the reverse rotation of the rotary seal shaft 9*a* causes the movable contact 5*a* to come in contact with the stationary contact 5*b* in the tank 1 of the phase A by an operation similar to that of the vacuum circuit breaker 50 according to the first embodiment. As a result, the phase A enters a connected state. When the manipulation lever 14 further applies torque to the coupler 19*a* after the movable contact 5*a* comes in contact with the stationary contact 5*b* in the phase A, the coupler 19*a* is twisted, which generates contact pressure in the phase A.

In a vacuum circuit breaker in which a plurality of vacuum valves are driven by one manipulator, if a distance between the movable contact and the stationary contact of a vacuum valve on the upstream side and a distance between the movable contact and the stationary contact of a vacuum valve on the downstream side, in a transmission path of a driving force from the manipulator, are equal to each other in a disconnected state, the contact pressure is not difficult to be generated in the vacuum valve on the downstream side in the transmission path of the driving force from the manipulator. In the vacuum circuit breaker 50 according to the second embodiment, the more on the downstream side the vacuum valve 4 is disposed in the transmission path of the driving force from the manipulator, the shorter the distance between the movable contact 5*a* and the stationary contact 5*b* in a disconnected state. Accordingly, the vacuum valve 4 enters a connected state and the contact pressure is generated in order from the vacuum valve 4 disposed on the downstream side in the transmission path of the driving force from the manipulator. Therefore, the vacuum circuit breaker 50 according to the second embodiment can generate contact pressure in the vacuum valves 4 of all the phases driven by the manipulator.

The vacuum circuit breaker 50 according to the second embodiment generates contact pressure by the couplers 19 being twisted. Therefore, no collision occurs between components when the contact pressure is released. Accordingly, even if each component that transmits the driving force from the manipulator is downsized, the contact pressure can be ensured.

Third Embodiment

Figure 5:
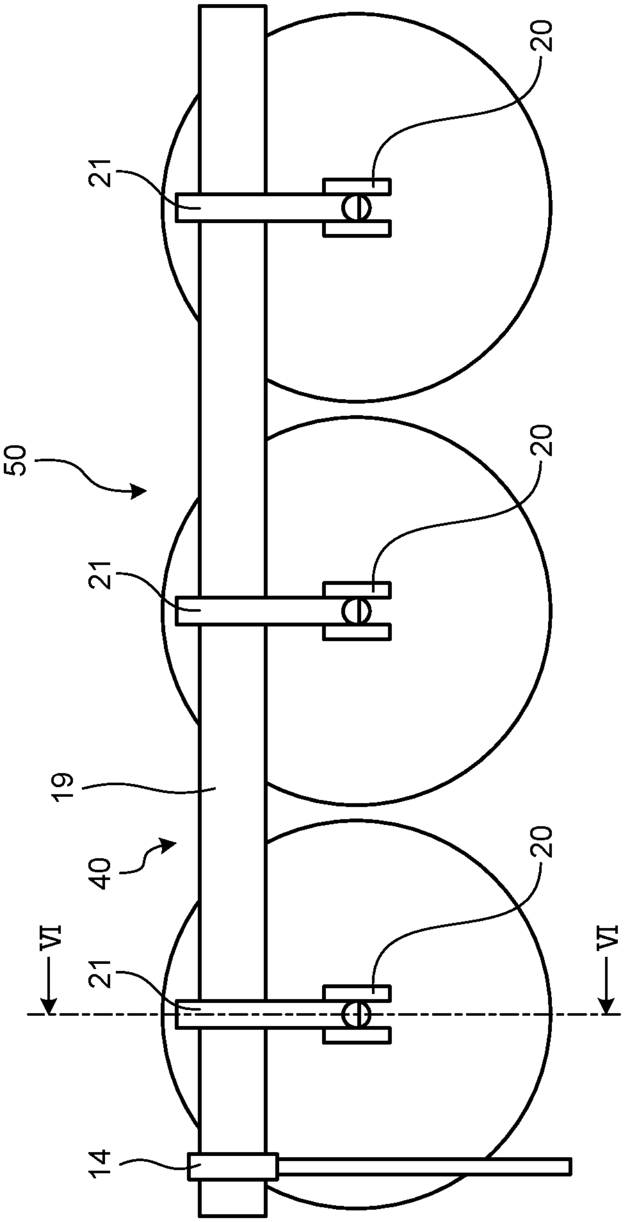
FIG. 5 is a side view of a vacuum circuit breaker according to a third embodiment.
Figure 6:
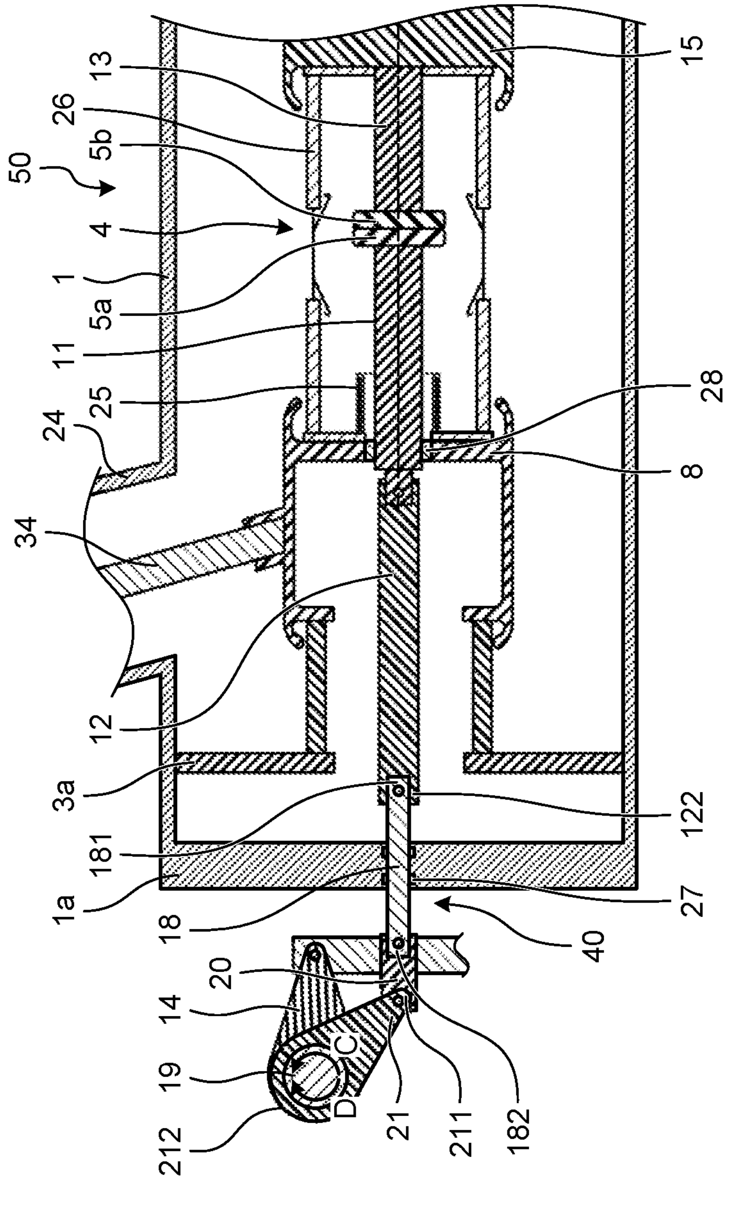
FIG. 6 is a vertical cross-sectional view of the vacuum circuit breaker according to the third embodiment.

FIG. 5 is a side view of a vacuum circuit breaker according to a third embodiment. FIG. 6 is a vertical cross-sectional view of the vacuum circuit breaker according to the third embodiment. In FIG. 6, the vacuum circuit breaker 50 is in a connected state where the movable contact 5*a* and the stationary contact 5*b* are in contact with each other. FIG. 6 illustrates a vertical cross section taken along a position of line VI-VI in FIG. 5. The vacuum circuit breaker 50 according to the third embodiment is of a three-phase collective type in which the tank 1 is mounted for each of the three phases, and contacts of the vacuum valve 4 in each phase are driven by a common manipulator. The vacuum circuit breaker 50 according to the third embodiment includes the contact driver 40 that opens and closes the movable contact 5*a* and the stationary contact 5*b* by moving the movable contact 5*a* by the driving force transmitted from the manipulator. The contact driver 40 includes the coupler 19, the manipulation lever 14, levers 21, linear seal shafts 18, and the insulating rods 12. The coupler 19 is disposed along the arrangement direction of the plurality of tanks 1. The manipulation lever 14 is fixed to an end portion of the coupler 19 and rotates the coupler 19 by receiving the driving force from the manipulator. The levers 21 are each fixed to the coupler 19 outside the tank 1 in each phase. The lever 21 rotates together with the coupler 19. The linear seal shafts 18 are each mounted in the tank 1 in each phase. The linear seal shaft 18 penetrates the end face 1*a* of the tank 1. An end portion 182 of the linear seal shaft 18 on the movable side is coupled to the lever 21. The insulating rods 12 are each mounted inside the tank 1 in each phase. The insulating rod 12 connects the linear seal shaft 18 and the movable lead 11 to each other. The insulating rod 12 moves in the arrangement direction of the movable contact 5*a* and the stationary contact 5*b* by the rotation of the lever 21.

The inner structure of the tank 1 in each phase is similar to that of the vacuum circuit breaker 50 according to the first embodiment. However, in the vacuum circuit breaker 50 according to the third embodiment, an end portion 181 of the linear seal shaft 18 on the stationary side is coupled to the end portion 122 of the insulating rod 12 on the movable side. The end portion 182 of the linear seal shaft 18 on the movable side is coupled to an end portion 211 of the lever 21 on the stationary side via a joint 20. An end portion 212 of the lever 21 on the movable side is fixed to the coupler 19. The coupler 19 is mounted above the movable lead 11. The manipulation lever 14 is fixed to the coupler 19 serving as a torsion bar spring, and torque is generated by the driving force from the manipulator. In the tank 1, a hole through which the linear seal shaft 18 passes is formed in the end face 1*a* on the movable side. A linear seal 27 is disposed in the hole in the end face 1*a*, and a gap between the tank 1 and the linear seal shaft 18 is sealed. Furthermore, the distance between the movable contact 5*a* and the stationary contact 5*b* in a disconnected state is different in each phase. The phase A, the phase B, and the phase C are sequentially set from the upstream side in the transmission path of the driving force from the manipulator. In the disconnected state, the distance between the movable contact 5*a* and the stationary contact 5*b* in the phase C is the shortest, the distance between the movable contact 5*a* and the stationary contact 5*b* in the phase B is the second shortest, and the distance between the movable contact 5*a* and the stationary contact 5*b* in the phase A is the longest. Other configurations are similar to those of the vacuum circuit breaker 50 according to the first embodiment.

In the following description, rotation of the coupler 19 in a direction in which a lower surface of the coupler 19 moves toward the movable side is referred to as "forward rotation". Furthermore, rotation of the coupler 19 in a direction in which the lower surface of the coupler 19 moves toward the stationary side is referred to as "reverse rotation". Note that, in FIG. 6, the direction of forward rotation of the coupler 19 is indicated by arrow C, and the direction of reverse rotation of the coupler 19 is indicated by arrow D.

When the vacuum circuit breaker 50 is in a connected state, the coupler 19 is twisted, presses the movable contact 5*a* against the stationary contact 5*b* in the vacuum valve 4 in each phase, and generates contact pressure necessary for energization.

When the manipulation lever 14 applies torque in a forward rotation direction to the coupler 19 when the vacuum circuit breaker 50 is in a connected state, the twisting of the coupler 19 is reduced, which eliminates the generation of the contact pressure in the phase A. When the manipulation lever 14 further applies torque in the forward rotation direction to the coupler 19 after the contact pressure in the phase A is eliminated, the coupler 19 rotates forward, and the movable contact 5*a* is separated from the stationary contact 5*b* in the tank 1 of the phase A by an operation similar to that of the vacuum circuit breaker 50 according to the first embodiment, so that the phase A enters a disconnected state. Furthermore, the forward rotation of the coupler 19 further reduces the twisting of the coupler 19, which eliminates the generation of the contact pressure in the phase B. When the manipulation lever 14 further applies torque in the forward rotation direction to the coupler 19 after the contact pressure in the phase B is eliminated, the coupler 19 rotates forward, and the movable contact 5*a* is separated from the stationary contact 5*b* in the tank 1 of the phase B by an operation similar to that of the vacuum circuit breaker 50 according to the first embodiment, so that the phase B enters a disconnected state. Furthermore, the forward rotation of the coupler 19 resolves the twisting of the coupler 19, which eliminates the generation of the contact pressure in the phase C. When the manipulation lever 14 further applies torque in the forward rotation direction to the coupler 19 after the contact pressure in the phase C is eliminated, the coupler 19 rotates forward, and the movable contact 5*a* is separated from the stationary contact 5*b* in the tank 1 of the phase C by an operation similar to that of the vacuum circuit breaker 50 according to the first embodiment, so that the phase C enters a disconnected state.

When the manipulation lever 14 applies torque in the reverse rotation direction to the coupler 19 when the vacuum circuit breaker 50 is in a disconnected state, the movable contact 5*a* comes in contact with the stationary contact 5*b* in the tank 1 of the phase C by an operation similar to that of the vacuum circuit breaker 50 according to the first embodiment, so that the phase C enters a connected state. When the manipulation lever 14 further applies torque in the reverse rotation direction to the coupler 19 after the phase C enters the connected state, the coupler 19 reversely rotates and the coupler 19 is twisted, which generates contact pressure in the phase C. Furthermore, the reverse rotation of the coupler 19 causes the movable contact 5*a* to come in contact with the stationary contact 5*b* in the tank 1 of the phase B by an operation similar to that of the vacuum circuit breaker 50 according to the first embodiment. As a result, the phase B enters a connected state. Furthermore, when the manipulation lever 14 further applies torque in the reverse rotation direction to the coupler 19 after the phase B enters the connected state, the coupler 19 reversely rotates and the twisting of the coupler 19 is increased, which generates contact pressure in the phase B. When the manipulation lever 14 further applies torque in the reverse rotation direction to the coupler 19 after the contact pressure is generated in the phase B, the coupler 19 reversely rotates, and the movable contact 5*a* comes in contact with the stationary contact 5*b* in the tank 1 of the phase A by an operation similar to that of the vacuum circuit breaker 50 according to the first embodiment, so that the phase A enters a connected state. When the manipulation lever 14 further applies torque in the reverse rotation direction to the coupler 19 after the phase A enters the connected state, the twisting of the coupler 19 is increased, which generates contact pressure in the phase A.

The vacuum circuit breaker 50 according to the third embodiment generates contact pressure by the coupler 19 being twisted. Therefore, no collision occurs between components when the contact pressure is released. Accordingly, even if each component that transmits the driving force from the manipulator is downsized, the contact pressure can be ensured.

Fourth Embodiment

Figure 7:
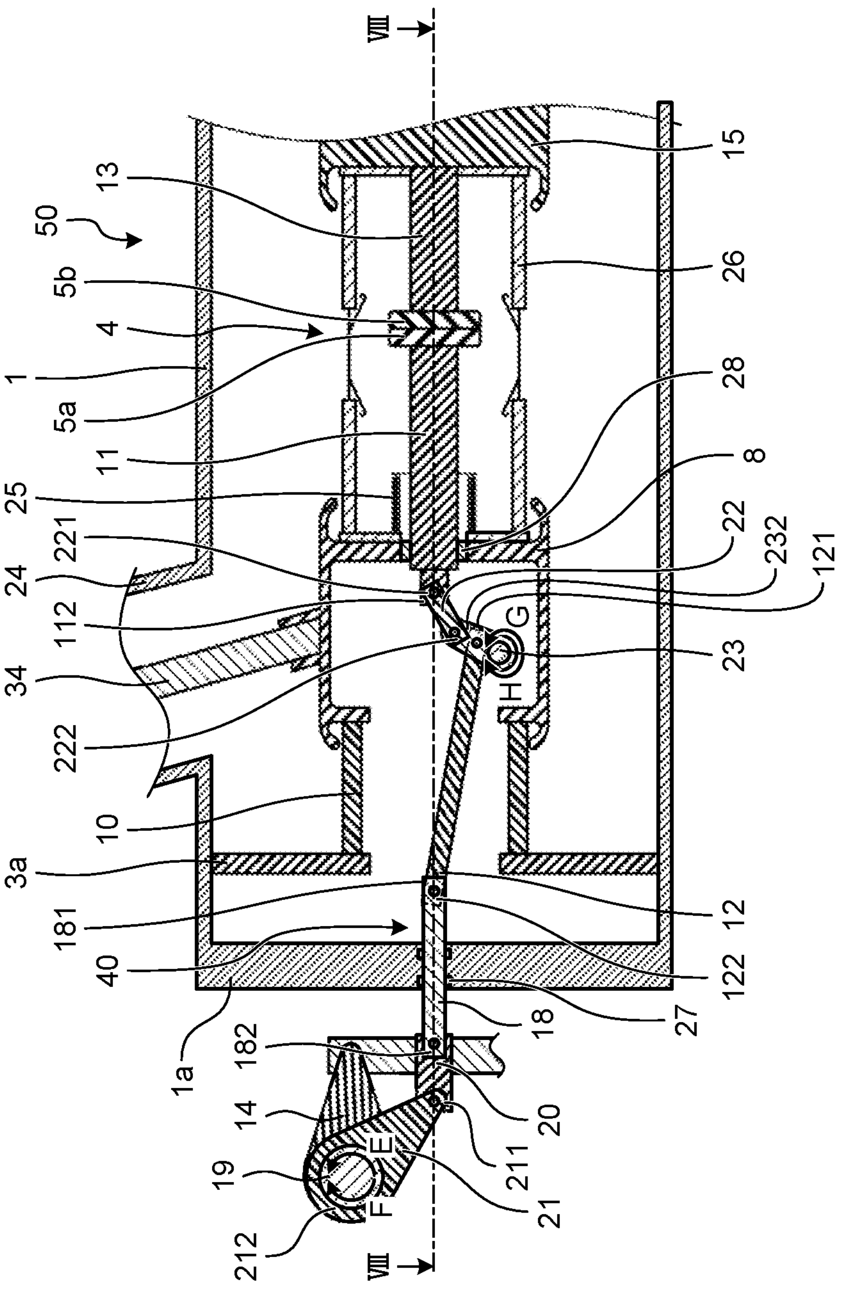
FIG. 7 is a vertical cross-sectional view of a vacuum circuit breaker according to a fourth embodiment.
Figure 8:
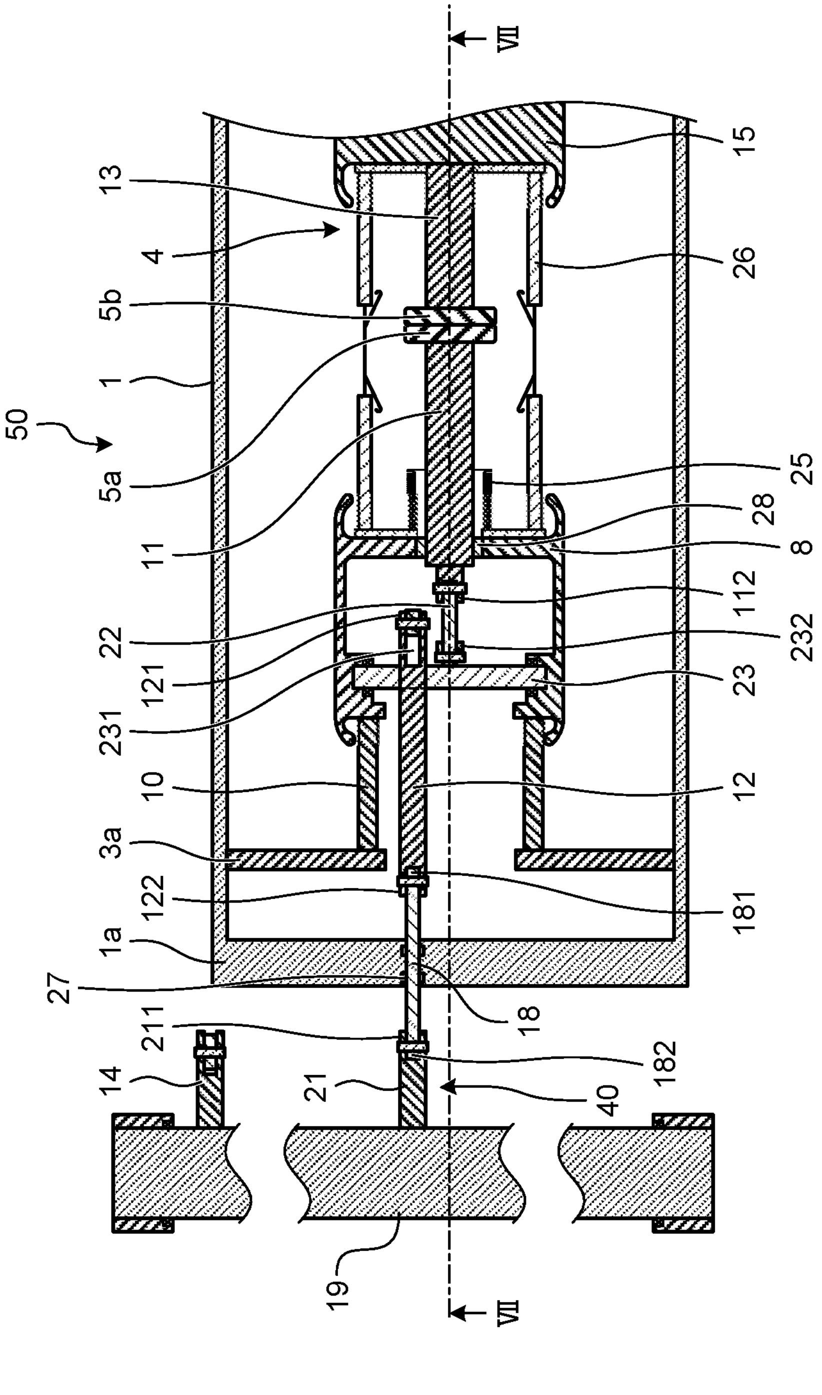
FIG. 8 is a horizontal cross-sectional view of the vacuum circuit breaker according to the fourth embodiment.

FIG. 7 is a vertical cross-sectional view of a vacuum circuit breaker according to a fourth embodiment. FIG. 8 is a horizontal cross-sectional view of the vacuum circuit breaker according to the fourth embodiment. In FIGS. 7 and 8, the vacuum circuit breaker 50 is in a connected state where the movable contact 5*a* and the stationary contact 5*b* are in contact with each other. FIG. 8 illustrates a horizontal cross section taken along a position of line VIII-VIII in FIG. 7. FIG. 7 illustrates a vertical cross section taken along a position of line VII-VII in FIG. 8. The vacuum circuit breaker 50 according to the fourth embodiment includes the contact driver 40 that opens and closes the movable contact 5*a* and the stationary contact 5*b* by moving the movable contact 5*a* by the driving force transmitted from the manipulator. The contact driver 40 includes the coupler 19, the manipulation lever 14, the lever 21, the linear seal shaft 18, the insulating rod 12, a torsion bar shaft 23, and a link 22. The coupler 19 is disposed outside the tank 1. The manipulation lever 14 is fixed to an end portion of the coupler 19 and rotates the coupler 19 by receiving the driving force from the manipulator. The lever 21 is fixed to the coupler 19 outside the tank 1 and rotates together with the coupler 19. The linear seal shaft 18 penetrates the end face 1*a* of the tank 1. The end portion 182 of the linear seal shaft 18 on the movable side is coupled to the lever 21. The insulating rod 12 is mounted inside the tank 1. The end portion 122 of the insulating rod 12 on the movable side is coupled to the end portion 181 of the linear seal shaft 18 on the stationary side. The torsion bar shaft 23 is rotatably mounted inside the tank 1 and includes a first arm 231 and a second arm 232. The end portion 121 of the insulating rod 12 on the stationary side is coupled to a distal end of the first arm 231. The link 22 has an end portion 222 on the movable side coupled to a distal end of the second arm 232 and an end portion 221 on the stationary side coupled to the movable lead 11. In the vacuum circuit breaker 50 according to the fourth embodiment, the torsion bar shaft 23 serves as a torsion bar spring.

The end portion 221 of the link 22 on the stationary side is coupled to the end portion 112 of the movable lead 11 on the movable side. Furthermore, the torsion bar shaft 23 is mounted inside a tube of the movable-side shield 8. The first arm 231 and the second arm 232 extend in a radial direction of the torsion bar shaft 23. The first arm 231 and the second arm 232 are provided at positions different from each other in the axial direction of the torsion bar shaft 23. The end portion 182 of the linear seal shaft 18 on the movable side is coupled to the end portion 211 of the lever 21 on the stationary side via the joint 20. The end portion 212 of the lever 21 on the movable side is fixed to the coupler 19. A hole through which the linear seal shaft 18 passes is formed in the end face 1*a* of the tank 1 on the movable side. The linear seal 27 is disposed in the hole in the end face 1*a*, and a gap between the tank 1 and the linear seal shaft 18 is sealed. Other configurations are similar to those of the vacuum circuit breaker 50 according to the first embodiment.

The torsion bar shaft 23 is made of spring steel. The torsion bar shaft 23 is mounted below the movable lead 11. When the vacuum circuit breaker 50 is in a connected state, the torsion bar shaft 23 is twisted, presses the movable contact 5*a* against the stationary contact 5*b*, and generates contact pressure necessary for energization.

In the following description, rotation of the coupler 19 or the torsion bar shaft 23 in a direction in which the lower surface of the coupler 19 or the torsion bar shaft 23 moves toward the movable side is referred to as "forward rotation". Furthermore, rotation of the coupler 19 or the torsion bar shaft 23 in a direction in which the lower surface of the coupler 19 or the torsion bar shaft 23 moves toward the stationary side is referred to as "reverse rotation". Note that, in FIG. 7, the direction of forward rotation of the coupler 19 is indicated by arrow E, and the direction of reverse rotation of the coupler 19 is indicated by arrow F. Furthermore, the direction of forward rotation of the torsion bar shaft 23 is indicated by arrow G, and the direction of reverse rotation of the torsion bar shaft 23 is indicated by arrow H.

In the vacuum circuit breaker 50 according to the fourth embodiment, by the manipulator rotating the coupler 19 forward, the linear seal shaft 18 and the insulating rod 12 move toward the stationary side. The movement of the insulating rod 12 toward the stationary side causes the torsion bar shaft 23, the distal end of the first arm 231 of which is coupled to the end portion 121 of the insulating rod 12 on the stationary side, to reversely rotate. The reverse rotation of the torsion bar shaft 23 moves the link 22 and the movable lead 11 toward the stationary side. When the coupler 19 further rotates forward in a state where the movable contact 5*a* and the stationary contact 5*b* are in contact with each other, the linear seal shaft 18 and the insulating rod 12 move toward the stationary side, but the link 22 and the movable lead 11 are not displaced, so that the torsion bar shaft 23 is twisted, which generates contact pressure.

When the coupler 19 is reversely rotated by the driving force from the manipulator when the vacuum circuit breaker 50 is in a connected state, the linear seal shaft 18 and the insulating rod 12 move toward the movable side. The movement of the insulating rod 12 toward the movable side causes the torsion bar shaft 23, the distal end of the first arm 231 of which is coupled to the end portion 121 of the insulating rod 12 on the stationary side, to rotate forward. The forward rotation of the torsion bar shaft 23 resolves the twisting of the torsion bar shaft 23, which eliminates the generation of the contact pressure. When the coupler 19 further reversely rotates after the twisting of the torsion bar shaft 23 is released, the linear seal shaft 18 and the insulating rod 12 further move toward the movable side, and the torsion bar shaft 23 further reversely rotates. The further reverse rotation of the torsion bar shaft 23 causes the link 22, the end portion 222 on the movable side of which is fixed to the distal end of the second arm 232, to move toward the movable side. When the link 22 moves toward the movable side, the movable lead 11, the end portion 112 on the movable side of which is coupled to the link 22, moves toward the movable side. The movement of the movable lead 11 toward the movable side causes the movable contact 5*a* to be separated from the stationary contact 5*b*, leading the vacuum circuit breaker 50 to enter a disconnected state.

When the coupler 19 is rotated forward by the driving force from the manipulator when the vacuum circuit breaker 50 is in a disconnected state, the end portion 211 of the lever 21 on the stationary side moves toward the stationary side. When the end portion 211 of the lever 21 on the stationary side moves toward the stationary side, the linear seal shaft 18, the end portion 182 on the movable side of which is coupled to the lever 21 via the joint 20, moves toward the stationary side. When the linear seal shaft 18 moves toward the stationary side, the insulating rod 12, the end portion 122 on the movable side of which is coupled to the end portion 181 of the linear seal shaft 18 on the stationary side, moves toward the stationary side. When the insulating rod 12 moves toward the stationary side, the torsion bar shaft 23, the distal end of the first arm 231 of which is coupled to the end portion 121 of the insulating rod 12 on the stationary side, reversely rotates. The reverse rotation of the torsion bar shaft 23 causes the link 22, the end portion 222 on the movable side of which is coupled to the distal end of the second arm 232, to move toward the stationary side. When the link 22 moves toward the stationary side, the movable lead 11, the end portion 112 on the movable side of which is coupled to the end portion 221 of the link 22 on the stationary side, moves toward the stationary side. The movement of the movable lead 11 toward the stationary side causes the movable contact 5*a* to come in contact with the stationary contact 5*b*, leading the vacuum circuit breaker 50 to enter a connected state. When the coupler 19 further rotates forward in a state where the movable contact 5*a* and the stationary contact 5*b* are in contact with each other, the torsion bar shaft 23 is twisted and the movable contact 5*a* is pressed against the stationary contact 5*b*, which generates contact pressure.

The vacuum circuit breaker 50 according to the fourth embodiment generates contact pressure by the torsion bar shaft 23 being twisted. Therefore, no collision occurs between components when the contact pressure is released. Accordingly, even if each component that transmits the driving force from the manipulator is downsized, the contact pressure can be ensured.

Fifth Embodiment

Figure 9:
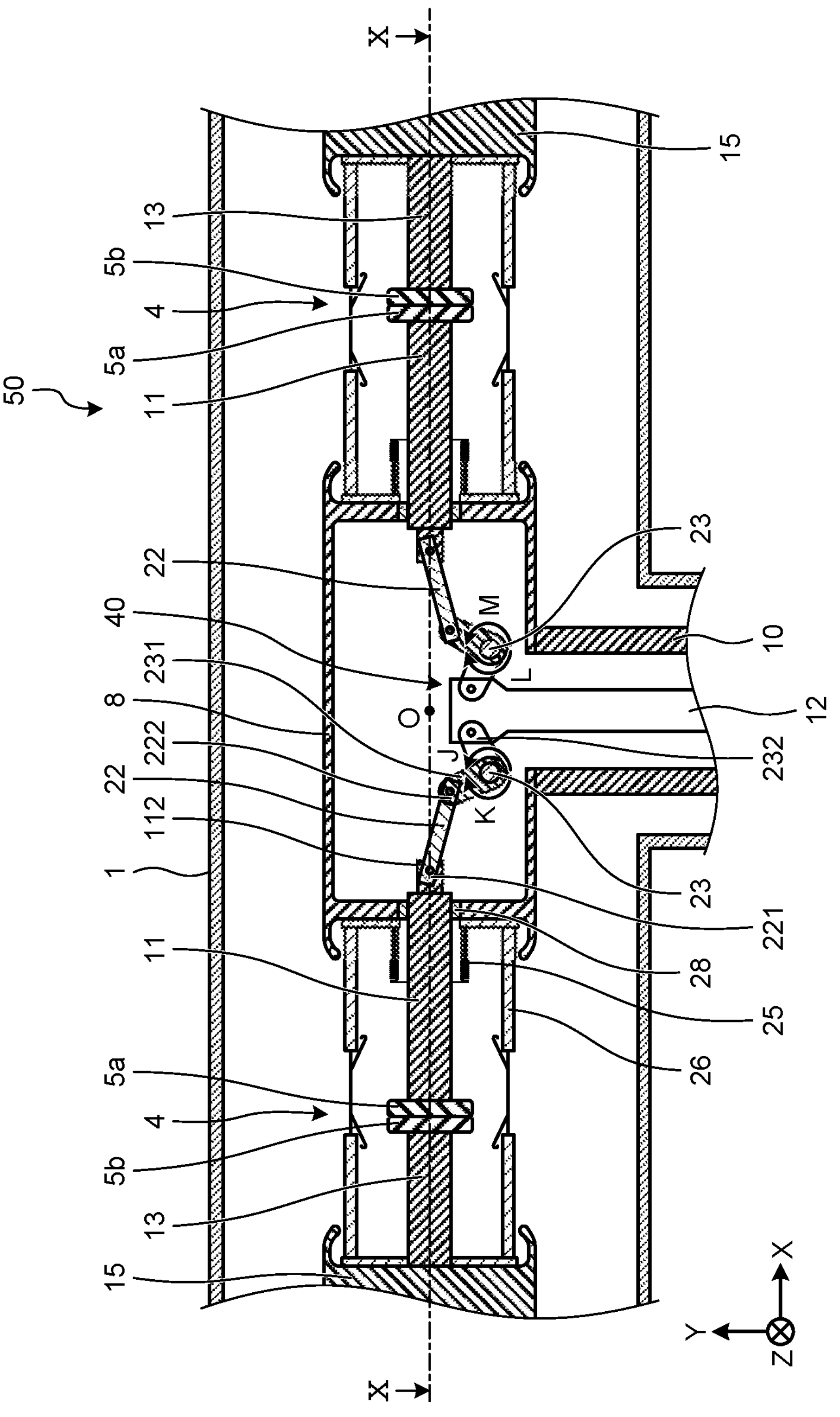
FIG. 9 is a vertical cross-sectional view of a vacuum circuit breaker according to a fifth embodiment.
Figure 10:
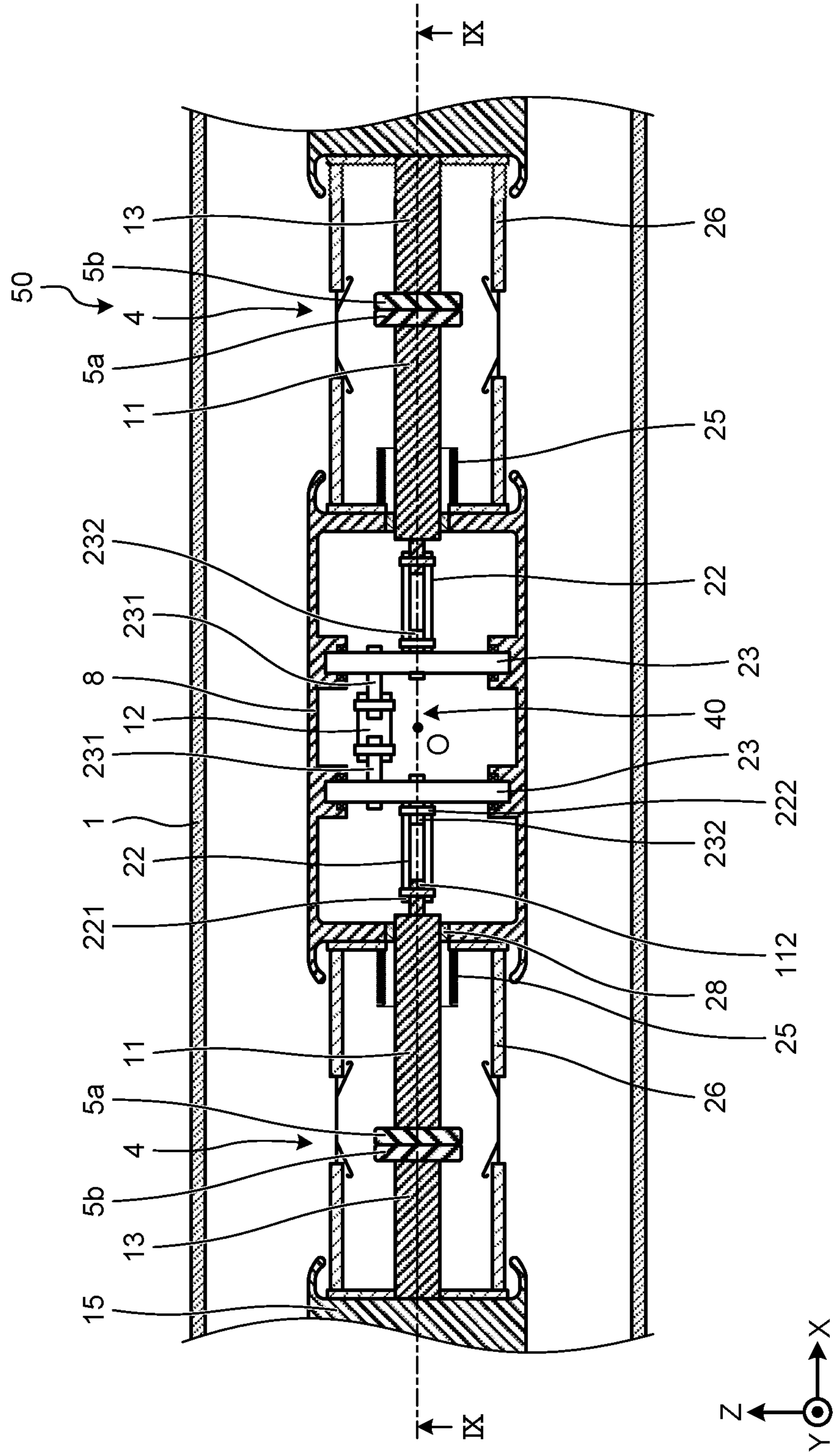
FIG. 10 is a horizontal cross-sectional view of the vacuum circuit breaker according to the fifth embodiment.

FIG. 9 is a vertical cross-sectional view of a vacuum circuit breaker according to a fifth embodiment. FIG. 10 is a horizontal cross-sectional view of the vacuum circuit breaker according to the fifth embodiment. In FIGS. 9 and 10, the vacuum circuit breaker 50 is in a connected state where the movable contact 5*a* and the stationary contact 5*b* are in contact with each other. FIG. 10 illustrates a horizontal cross section taken along a position of line X-X in FIG. 9. FIG. 9 illustrates a vertical cross section taken along a position of line IX-IX in FIG. 10. The vacuum circuit breaker 50 according to the fifth embodiment has a double-break structure including two vacuum valves 4 each including the movable contact 5*a* and the stationary contact 5*b*. The vacuum circuit breaker 50 according to the fifth embodiment includes the contact driver 40 that opens and closes the movable contacts 5*a* and the stationary contacts 5*b* by moving the movable contacts 5*a* by the driving force transmitted from the manipulator. The contact driver 40 includes the insulating rod 12, the torsion bar shafts 23, and the links 22. The insulating rod 12 is moved in a direction perpendicular to the arrangement direction of the movable contacts 5*a* and the stationary contacts 5*b* by receiving the driving force from the manipulator. The torsion bar shafts 23 are rotatably mounted inside the tank 1 and each include the first arm 231 and the second arm 232. The insulating rod 12 is coupled to the distal ends of the first arms 231. The links 22 each have the end portion 222 on the movable side coupled to the distal end of the second arm 232 and the end portion 221 on the stationary side coupled to the movable lead 11. In the vacuum circuit breaker 50 according to the fifth embodiment, the torsion bar spring is the torsion bar shaft 23.

The movable contacts 5*a* and the stationary contacts 5*b* are arranged in the longitudinal direction of the tank 1. Therefore, the insulating rod 12 moves in the direction perpendicular to the longitudinal direction of the tank 1. Here, the center of the tank 1 in the longitudinal direction and the center of the cross section perpendicular to the longitudinal direction is defined as an origin O. Furthermore, the longitudinal direction of the tank 1 is defined as an X axis, and a movable direction of the insulating rod 12 is defined as a Y axis. Similarly to the first embodiment, in the arrangement direction of the movable contact 5*a* and the stationary contact 5*b*, the direction from the stationary contact 5*b* toward the movable contact 5*a* is defined as the "movable side" and the direction from the movable contact 5*a* toward the stationary contact 5*b* is defined as the "stationary side". In such a case, out of two points in a region where the coordinate value of the X axis is positive, a point having a smaller coordinate value of the X axis is located on the "movable side". Similarly, out of two points in a region where the coordinate value of the X axis is negative, a point having a greater coordinate value of the X axis is located on the "movable side". Therefore, in the region where the coordinate value of the X axis is positive, moving in a direction in which the coordinate value of the X axis decreases means "moving toward the movable side", and in the region where the coordinate value of the X axis is negative, moving in a direction in which the coordinate value of the X axis increases means "moving toward the movable side". Furthermore, in the region where the coordinate value of the X axis is positive, moving in a direction in which the coordinate value of the X axis increases means "moving toward the stationary side", and in the region where the coordinate value of the X axis is negative, moving in a direction in which the coordinate value of the X axis decreases means "moving toward the stationary side". That is, moving in a direction in which an absolute value of the coordinate value of the X axis decreases means "moving toward the movable side", and moving in a direction in which the absolute value of the coordinate value of the X axis increases means "moving toward the stationary side.

The stationary contact 5*b* in each of the two vacuum valves 4 is connected to an external conductor (not illustrated) via the stationary lead 13 and the stationary-side shield 15. That is, the vacuum circuit breaker 50 according to the fifth embodiment opens and closes at two locations between the external conductors.

The torsion bar shafts 23 are mounted inside the tube of the movable-side shield 8. The torsion bar shafts 23 are mounted below the movable leads 11. The first arm 231 and the second arm 232 extend in a radial direction of the torsion bar shaft 23. The first arm 231 and the second arm 232 are provided at positions different from each other in the axial direction of the torsion bar shaft 23.

In the following description, rotation of the torsion bar shaft 23 in the direction in which a lower surface of the torsion bar shaft 23 moves toward the movable side is referred to as "forward rotation". Furthermore, rotation of the torsion bar shaft 23 in the direction in which the lower surface of the torsion bar shaft 23 moves toward the stationary side is referred to as "reverse rotation". Note that, in FIG. 9, directions of forward rotation of the torsion bar shafts 23 are indicated by arrows J and L, and directions of reverse rotation of the torsion bar shafts 23 are indicated by arrows K and M. A direction of the forward rotation of the torsion bar shaft 23 disposed in the region where the coordinate value of the X axis is positive is opposite to a direction of the forward rotation of the torsion bar shaft 23 disposed in the region where the coordinate value of the X axis is negative. Similarly, a direction of the reverse rotation of the torsion bar shaft 23 disposed in the region where the coordinate value of the X axis is positive is opposite to a direction of the reverse rotation of the torsion bar shaft 23 disposed in the region where the coordinate value of the X axis is negative.

When a disconnection command is input to the manipulator (not illustrated), the insulating rod 12 moves in a −Y direction, which is a direction in which the insulating rod 12 is pulled out from the tank 1. When the insulating rod 12 moves in the −Y direction, the torsion bar shaft 23, the distal end of the first arm 231 of which is fixed to the insulating rod 12, reversely rotates. The reverse rotation of the torsion bar shaft 23 resolves the twisting of the torsion bar shaft 23, which eliminates the generation of contact pressure. When the insulating rod 12 further moves in the −Y direction after the twisting of the torsion bar shaft 23 is released, the torsion bar shaft 23 further reversely rotates, and the distal end of the second arm 232 moves toward the movable side. When the distal end of the second arm 232 moves toward the movable side, the link 22, the end portion 222 on the movable side of which is coupled to the distal end of the second arm 232, moves toward the movable side. When the link 22 moves toward the movable side, the movable lead 11, the end portion 112 on the movable side of which is fixed to the end portion 221 of the link 22 on the stationary side, moves toward the movable side. The movement of the movable lead 11 toward the movable side causes the movable contact 5*a* to be separated from the stationary contact 5*b*, leading the vacuum circuit breaker 50 to enter a disconnected state.

When a connection command is input to the manipulator (not illustrated), the insulating rod 12 moves in a +Y direction, which is a direction in which the insulating rod 12 is pushed into the tank 1. When the insulating rod 12 moves toward the +Y direction, the torsion bar shaft 23, the distal end of the first arm 231 of which is fixed to the insulating rod 12, rotates forward. When the torsion bar shaft 23 rotates forward, the distal end of the second arm 232 moves toward the stationary side. When the distal end of the second arm 232 moves toward the stationary side, the link 22, the end portion 222 on the movable side of which is coupled to the distal end of the second arm 232, moves toward the stationary side. When the link 22 moves toward the stationary side, the movable lead 11, the end portion 112 on the movable side of which is fixed to the end portion 221 of the link 22 on the stationary side, moves toward the stationary side. The movement of the movable lead 11 toward the stationary side causes the movable contact 5*a* to come in contact with the stationary contact 5*b*, leading the vacuum circuit breaker 50 to enter a connected state. When the insulating rod 12 further moves in the +Y direction after the movable contact 5*a* comes in contact with the stationary contact 5*b*, the torsion bar shaft 23 is twisted, which generates contact pressure.

Note that the vacuum circuit breaker 50 having a double-break structure opening or closing at two locations between external conductors has been described here, but the vacuum circuit breaker 50 may have a multiple-break structure opening or closing at three or more locations between external conductors.

The vacuum circuit breaker 50 according to the fifth embodiment generates contact pressure by the torsion bar shaft 23 being twisted. Therefore, no collision occurs between components when the contact pressure is released. Accordingly, even if each component that transmits the driving force from the manipulator is downsized, the contact pressure can be ensured.

The above configurations illustrated in the embodiments are examples of the contents, and can be combined with other known techniques, and the above configurations can be partly omitted or changed without departing from the gist.

REFERENCE SIGNS LIST

1 tank; 1*a* end face; 3*a* support plate; 4 vacuum valve; 5*a* movable contact; 5*b* stationary contact; 6 cap; 7, 21 lever; 8 movable-side shield; 9, 9*a*, 9*b*, 9*c* rotary seal shaft; 10 movable-side insulating support tube; 11 movable lead; 12 insulating rod; 13 stationary lead; 14 manipulation lever; 15 stationary-side shield; 16 bearing; 17 rotary seal; 18 linear seal shaft; 19, 19*a*, 19*b*, 19*c* coupler; 20 joint; 22 link; 23 torsion bar shaft; 24 bushing; 25 bellows; 26 vacuum container; 27 linear seal; 28 contact; 34 external conductor; 40 contact driver; 50 vacuum circuit breaker; 71, 121, 181, 211, 221 end portion on stationary side; 72, 112, 122, 182, 212, 222 end portion on movable side; 91 one end portion; 92 opposite end portion; 231 first arm; 232 second arm.

The invention claimed is:

1. A vacuum circuit breaker, comprising:

a plurality of tanks each having a tubular shape and provided in each phase of an alternating current;

a plurality of vacuum valves each including a movable contact, a stationary contact, a movable lead electrically connected to the movable contact, and a stationary lead electrically connected to the stationary contact, the vacuum valves each being accommodated in a tank in each phase, the tank being one of the plurality of tanks; and a contact driver configured to open and close the movable contact and the stationary contact by moving the movable contact by a driving force transmitted from a manipulating device, wherein the contact driver includes:

a rotary seal shaft disposed inside the tank and both end portions of the rotary seal shaft protruding outward from the tank;

a coupler fixed to an end portion of the rotary seal shaft, and configured to rotate together with the rotary seal shaft, and configured to generate contact pressure that presses the movable contact against the stationary contact by being twisted by the driving force in a state where the movable contact and the stationary contact are in contact with each other;

a manipulation lever fixed to the coupler located at one end of the plurality of tanks in an arrangement direction of the tanks, and configured to rotate the coupler and the rotary seal shaft by receiving the driving force;

a lever fixed to the rotary seal shaft inside the tank in each phase, and configured to rotate together with the rotary seal shaft; and an insulating rod mounted inside the tank in each phase, and connecting the lever and the movable lead to each other, the insulating rod is configured to move in an arrangement direction of the movable contact and the stationary contact by rotation of the lever.

2. A vacuum circuit breaker, comprising:

a plurality of tanks each having a tubular shape and provided in each phase of an alternating current;

a plurality of vacuum valves each including a movable contact, a stationary contact, a movable lead electrically connected to the movable contact, and a stationary lead electrically connected to the stationary contact, the vacuum valves each being accommodated in a tank in each phase, the tank being one of the plurality of tanks; and a contact driver configured to open and close the movable contact and the stationary contact by moving the movable contact by a driving force transmitted from a manipulating device, wherein the contact driver includes:

a coupler disposed along an arrangement direction of the plurality of tanks, and configured to generate contact pressure that presses the movable contact against the stationary contact by being twisted by the driving force in a state where the movable contact and the stationary contact are in contact with each other;

a manipulation lever fixed to an end portion of the coupler, and configured to rotate the coupler by receiving the driving force;

a lever fixed to the coupler outside the tank in each phase, and configured to rotate together with the coupler;

a linear seal shaft mounted in the tank in each phase, and penetrating one end face of the tank, one end portion of the linear seal shaft being coupled to the lever; and an insulating rod mounted inside the tank in each phase, and connecting the linear seal shaft and the movable lead to each other, and configured to move in an arrangement direction of the movable contact and the stationary contact by rotation of the lever.

3. The vacuum circuit breaker according to claim 2, wherein with respect to the plurality of vacuum valves, the farther the vacuum valve is disposed at a position from the manipulation lever in the arrangement direction of the plurality of tanks, the shorter a distance between the movable contact and the stationary contact in a disconnected state where the movable contact and the stationary contact are separated from each other.

4. A vacuum circuit breaker, comprising:

a tank having a tubular shape;

a vacuum valve including a movable contact, a stationary contact, a movable lead electrically connected to the movable contact, and a stationary lead electrically connected to the stationary contact, the vacuum valve being accommodated in the tank; and a contact driver configured to open and close the movable contact and the stationary contact by moving the movable contact by a driving force transmitted from a manipulator, wherein the contact driver includes:

a coupler disposed outside the tank;

a manipulation lever fixed to an end portion of the coupler, and configured to rotate the coupler by receiving the driving force;

a lever fixed to the coupler outside the tank, and configured to rotate together with the coupler;

a linear seal shaft penetrating one end face of the tank, one end portion of the linear seal shaft being coupled to the lever;

an insulating rod mounted inside the tank, one end portion of the insulating rod being coupled to an opposite end portion of the linear seal shaft;

a torsion bar shaft rotatably mounted inside the tank, the torsion bar shaft including a first arm and a second arm, an opposite end portion of the insulating rod being coupled to a distal end of the first arm, and configured to generate contact pressure that presses the movable contact against the stationary contact by being twisted by the driving force in a state where the movable contact and the stationary contact are in contact with each other; and a link having one end portion coupled to a distal end of the second arm and an opposite end portion coupled to the movable lead.

5. The vacuum circuit breaker according to claim 4, comprising a plurality of the tanks and a plurality of the vacuum valves, the tank and the vacuum valve being included in each phase of an alternating current, wherein the coupler is disposed along an arrangement direction of the plurality of tanks, and the lever, the linear seal shaft, the torsion bar shaft, and the link are included in each phase.

6. The vacuum circuit breaker according to claim 5, wherein with respect to the plurality of vacuum valves, the farther the vacuum valve is disposed at a position from the manipulation lever in the arrangement direction of the plurality of tanks, the shorter a distance between the movable contact and the stationary contact in a disconnected state where the movable contact and the stationary contact are separated from each other.

* * * * *